(12) United States Patent
Kagaya et al.

(10) Patent No.: US 11,951,973 B2
(45) Date of Patent: Apr. 9, 2024

(54) TECHNICAL FIELD OF METHOD OF CONTROLLING ELECTRIC VEHICLE AND DRIVE SYSTEM OF ELECTRIC VEHICLE

(71) Applicant: Nissan Motor Co., Ltd., Kanagawa (JP)

(72) Inventors: Takayuki Kagaya, Kanagawa (JP); Masato Koga, Kanagawa (JP); Yuuki Nakajima, Kanagawa (JP); Katsunori Tanaka, Kanagawa (JP); Tetsuya Iwasaki, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 498 days.

(21) Appl. No.: 17/280,617

(22) PCT Filed: Sep. 26, 2018

(86) PCT No.: PCT/JP2018/035812
§ 371 (c)(1),
(2) Date: Mar. 26, 2021

(87) PCT Pub. No.: WO2020/065800
PCT Pub. Date: Apr. 2, 2020

(65) Prior Publication Data
US 2022/0118966 A1    Apr. 21, 2022

(51) Int. Cl.
*B60W 20/20* (2016.01)
*B60K 6/442* (2007.10)
*B60W 20/40* (2016.01)

(52) U.S. Cl.
CPC ............. *B60W 20/20* (2013.01); *B60K 6/442* (2013.01); *B60W 20/40* (2013.01);
(Continued)

(58) Field of Classification Search
CPC ................. B60W 20/20; B60W 20/40; B60W 2510/0208; B60W 2520/10;
(Continued)

(56) References Cited

U.S. PATENT DOCUMENTS

| 6,059,059 A | 5/2000 | Schmidt-Brucken |
| 2004/0204291 A1 | 10/2004 | Atarashi et al. |

(Continued)

FOREIGN PATENT DOCUMENTS

| JP | H10259746 A | 9/1998 |
| JP | 2004123060 A | 4/2004 |

(Continued)

*Primary Examiner* — Rami Khatib
(74) *Attorney, Agent, or Firm* — Osha Bergman Watanabe & Burton LLP

(57) ABSTRACT

A drive system of an electric vehicle includes: an internal combustion engine; a generating motor provided so as to be able to generate electricity by receiving motive force from the internal combustion engine; and a travel motor provided so as to be able to be driven by electric power generated by the generating motor, and the drive system is configured so as to be able to switch a series hybrid mode and an engine direct connected mode, the series hybrid mode being a mode in which, while the internal combustion engine and the drive wheel are linked via a first clutch so as to be unlinkable/linkable, the travel motor and the drive wheel are linked via a second clutch different from the first clutch so as to be unlinkable/linkable, and the travel motor is used as a drive power source such that the electric vehicle travels by transmitting motive force from the travel motor to the drive wheel, the engine direct connected mode being a mode in which at least one of the internal combustion engine and the generator is used as a drive power source such that the electric vehicle travels by transmitting motive force from the drive power source to the drive wheel. At a mode switching time from the engine direct connected mode to the series (Continued)

hybrid mode involving deceleration, when the rotation synchronization or the engagement of the second clutch on an engagement side is not completed before the vehicle speed is decelerated to a predetermined vehicle speed, the first clutch on a disengagement side is disengaged before the engagement of the second clutch is completed.

9 Claims, 13 Drawing Sheets

(52) U.S. Cl.
CPC . *B60W 2510/0208* (2013.01); *B60W 2520/10* (2013.01); *B60W 2520/105* (2013.01); *B60W 2520/12* (2013.01); *B60W 2520/125* (2013.01); *B60W 2540/12* (2013.01); *B60Y 2200/92* (2013.01)

(58) Field of Classification Search
CPC ....... B60W 2520/105; B60W 2520/12; B60W 2520/125; B60W 2540/12; B60W 10/06; B60W 10/02; B60W 10/08; B60W 10/184; B60W 30/18109; B60K 6/442; B60K 6/387; B60Y 2200/92; Y02T 10/62
See application file for complete search history.

(56) References Cited

U.S. PATENT DOCUMENTS

| 2013/0211653 | A1  | 8/2013  | Matsui et al. |            |
|--------------|-----|---------|---------------|------------|
| 2014/0163827 | A1* | 6/2014  | Kim           | B60W 30/19 |
|              |     |         |               | 701/54     |
| 2014/0358340 | A1* | 12/2014 | Radev         | B60W 10/26 |
|              |     |         |               | 180/65.265 |
| 2015/0039167 | A1* | 2/2015  | Ideshio       | B60W 10/02 |
|              |     |         |               | 180/65.265 |
| 2015/0203103 | A1* | 7/2015  | Kobayashi     | B60K 6/48  |
|              |     |         |               | 180/65.265 |
| 2019/0126908 | A1* | 5/2019  | Yokota        | B60W 10/06 |
| 2019/0299975 | A1* | 10/2019 | Eriksson      | F02N 11/00 |

FOREIGN PATENT DOCUMENTS

| JP | 2004316693 A  | 11/2004 |
| JP | 2008094123 A  | 4/2008  |
| JP | 2010149630 A  | 7/2010  |
| WO | 2012053360 A1 | 4/2012  |

* cited by examiner

TECHNICAL FIELD OF METHOD OF CONTROLLING ELECTRIC VEHICLE AND DRIVE SYSTEM OF ELECTRIC VEHICLE

TECHNICAL FIELD

The present invention relates to a control method and a drive system of an electric vehicle that is configured so as to be capable of traveling by switching a series hybrid mode and an engine direct connected mode.

BACKGROUND ART

A series hybrid type drive system that is configured so as to drive a generator by a motive force from an internal combustion engine and to use electric power generated by this generator to operate an electric motor for travelling (hereinafter, referred to as "a travel motor") is known. As such a drive system, JP2004-123060A discloses one having a configuration in which the internal combustion engine and a drive wheel are linked via a clutch and the motive force from the internal combustion engine can be transmitted to the drive wheel by bypassing the travel motor (see FIG. 7).

SUMMARY OF INVENTION

With the technique disclosed by JP2004-123060A, in a case in which a vehicle is traveled in an engine direct connected mode in which the internal combustion engine is directly connected to the drive wheel, if the internal combustion engine is simply linked the drive wheel via the clutch, the connection of the motive force between the travel motor and the drive wheel is not shut off, and the travel motor is forcedly rotated by following the rotation of the drive wheel. With such a configuration, the friction caused by the travel motor becomes a load for propelling the vehicle, and thus, there is a risk in that an overall system efficiency is deteriorated and an electric mileage, which is a distance that the vehicle can travel par a unit electric power, is lowered.

In contrast, the applicant has considered to interpose a clutch (hereinafter, referred to as "a second clutch") between the travel motor and the drive wheel separately from the clutch (hereinafter, referred to as "a first clutch") provided between the internal combustion engine and the drive wheel and to engage the first clutch and disengage the second clutch in the engine direct connected mode. With such a configuration, it is possible to suppress the deterioration of the efficiency due to the forced rotation of the travel motor.

In the above, when travelling modes are switched, if the clutch that will be in an engaged state after a mode switching (hereinafter, referred to as "an engagement-side clutch") is simply engaged and the clutch that will be in a disengaged state after a mode switching (hereinafter, referred to as "a disengage-side clutch") is disengaged, there is still a remaining concern as follows. That is, when the engine direct connected mode is switched to a series hybrid mode in which the travel motor is used as the drive power source, there is a risk in that, depending on a travelling state during the switching, crossover between the engagement-side clutch and the disengagement-side clutch may not be achieved smoothly and a drivability may be deteriorated.

An object of the present invention is to provide a control method of an electric vehicle and a drive system of the electric vehicle in which the above-described problem is taken into consideration.

A control method of an electric vehicle according to one embodiment of the present invention is a control method of an electric vehicle provided with an internal combustion engine, a generating motor provided so as to be able to generate electricity by receiving motive force from the internal combustion engine, and a travel motor provided so as to be able to be driven by electric power generated by the generating motor, and the electric vehicle being configured so as to be able to switch a series hybrid mode and an engine direct connected mode, the series hybrid mode being a mode in which, while the internal combustion engine and a drive wheel are linked via a first clutch so as to be unlinkable/linkable, the travel motor and the drive wheel are linked via a second clutch different from the first clutch so as to be unlinkable/linkable, and the travel motor is used as a drive power source such that the electric vehicle travels by transmitting motive force from the travel motor to the drive wheel, the engine direct connected mode being a mode in which at least one of the internal combustion engine and the generating motor is used as a drive power source such that the electric vehicle travels by transmitting motive force from the drive power source to the drive wheel, wherein at a mode switching time from the engine direct connected mode to the series hybrid mode involving deceleration, when a rotation synchronization or an engagement of the second clutch on an engagement side is not completed before a vehicle speed is decelerated to a predetermined vehicle speed, the first clutch on a disengagement side is disengaged before the engagement of the second clutch is completed.

A drive system of an electric vehicle according to one embodiment of the present invention is also provided.

DESCRIPTION OF EMBODIMENTS

Embodiments of the present invention will be described below with reference to the drawings.

Figure 1:
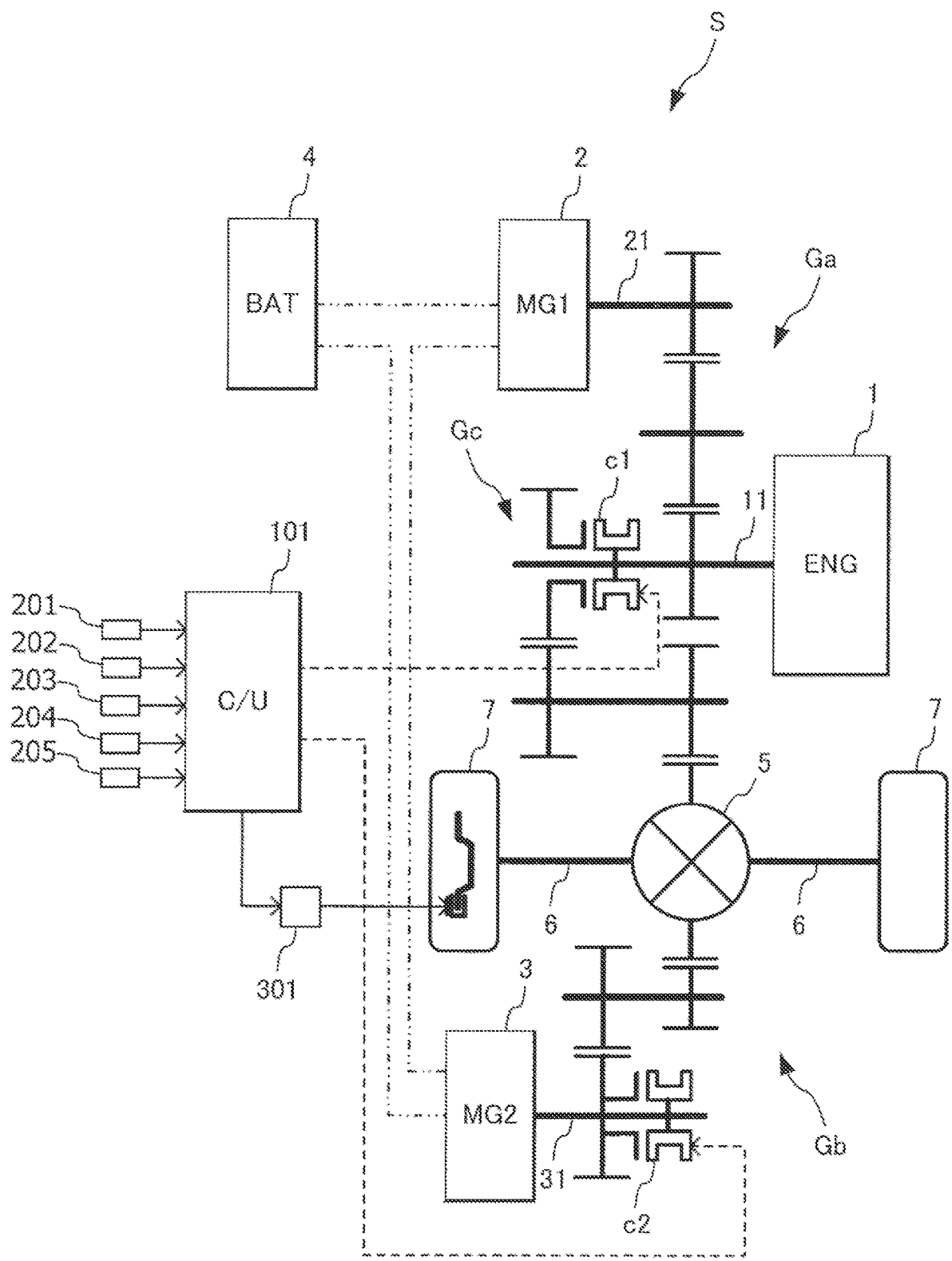
FIG. 1 is a schematic view showing an overall configuration of a drive system of an electric vehicle according to an embodiment of the present invention.

FIG. 1 shows an overall configuration of a drive system S of an electric vehicle according to an embodiment of the present invention.

The drive system according to this embodiment (hereinafter, simply referred to as "a drive system") S is mounted on the electric vehicle and forms a propulsion apparatus of the vehicle. The drive system S includes an internal combustion engine 1, an electric motor for generating electricity (hereinafter, referred to as "a generating motor") 2, and an electric motor for travelling (hereinafter, referred to as "a travel motor") 3.

An output shaft or a crankshaft 11 of the internal combustion engine (hereinafter, simply referred to as "an engine") 1 is connected to a rotation shaft 21 of the generating motor 2 via a gear train Ga formed of a plurality of gears. The torque from the engine 1 is transmitted to the generating motor 2 via the gear train Ga at a predetermined gear ratio so as to operate the generating motor 2. In this embodiment, the linkage between the engine 1 and the generating motor 2 via the gear train Ga is of a permanent type, in other words, the linkage cannot be cut off.

The generating motor 2 is electrically connected to the travel motor 3 and to a battery 4, and electric power generated by receiving a motive force supplied from the engine 1 is supplied to the travel motor 3 and the battery 4. The supply of the electric power from the generating motor 2 to the travel motor 3 and the supply of the electric power from the generating motor 2 to the battery 4 can be respectively executed in accordance with the driven state of the vehicle, the state of charge of the battery 4, and so forth. FIG. 1 schematically shows the electrical connections between the generating motor 2, the travel motor 3, and the battery 4 by two-dot chain lines.

The travel motor 3 is electrically connected to the battery 4, and a rotation shaft 31 of the travel motor 3 is linked to a ring gear of a differential 5 via a gear train Gb formed of a plurality of gears. The torque from the travel motor 3 is transmitted to the differential 5 via the gear train Gb at a predetermined gear ratio, and the torque is further distributed via the differential 5 to left and right driving shafts 6 and 6, thereby rotating drive wheels 7 and propelling the vehicle. In this embodiment, the travel motor 3 is configured by a motor generator that can be operated not only as the electric generator but also as a motor-engine, and in addition to the propulsion of the vehicle, the travel motor 3 can generated the electricity by receiving the supply of the motive force from the drive wheels 7 via the gear train Gb. It is possible to supply the electric power generated by the travel motor 3 to the battery 4 and use it to charge the battery 4.

Furthermore, in this embodiment, the output shaft 11 of the engine 1 is connected to a ring gear of the differential 5 via a gear train Gc formed of a plurality of gears. The torque from the engine 1 is transmitted to the differential 5 via the gear train Gc at a predetermined gear ratio, and the torque is distributed to the left and right driving shafts 6 and 6, thereby rotating the drive wheels 7 and propelling the vehicle.

In this embodiment, clutches c1 and c2 are respectively interposed to the gear train Gc and the gear train Gb, and the linkage between the engine 1 and the drive wheels 7 via the gear train Gc and the linkage between the travel motor 3 and the drive wheels 7 via the gear train Gb are configured so as to be cut off by the clutches c1 and c2, respectively. The clutches c1 and c2 may each be a positive clutch, and a suitable example of the clutches c1 and c2 may include a dog clutch. In this embodiment, the dog clutch is employed for both of the clutches c1 and c2. The clutch c1 that is provided on the gear train Gc on the side of the engine 1 serves as "a first clutch" according to this embodiment, and the clutch c2 that is provided on the gear train Gb on the side of the travel motor 3 serves as "a second clutch" according to this embodiment.

The operations of the engine 1, the generating motor 2, and the travel motor 3 and the states of the clutches c1 and c2 are electronically controlled by a controller 101. Although not limited, the controller 101 is formed of a microcomputer that is provided with, a central processing unit (CPU) as an electronic control unit, various storage units such as a ROM, a RAM, and so forth, an input/output interface, and so forth.

Information of various parameters indicating the driven state of the vehicle is input to the controller 101. In this embodiment, a signal indicating an operated amount of an accelerator pedal by a driver (hereinafter, referred to as "an accelerator position (an accelerator opening degree)") APO, a signal indicating a travelling speed of the vehicle (hereinafter, referred to as "a vehicle speed") VSP, a signal indicating a rotation speed Neng of the engine 1, a signal indicating a rotation speed Nmg1 of the generating motor 2, and a signal indicating a rotation speed Nmg2 of the travel motor 3 are input to the controller 101. In order to detect the various parameters, an accelerator position sensor 201 that detects the accelerator position APO, a vehicle speed sensor 202 that detects the vehicle speed VSP, an engine rotation speed sensor 203 that detects the rotation speed Neng of the engine 1 as a rotation speed per unit time (hereinafter, referred to as "an engine rotation speed"), a generating motor rotation speed sensor 204 that detects the rotation speed Nmg1 of the generating motor 2 as a generating motor rotation speed, and a travel motor rotation speed sensor 205 that detects the rotation speed Nmg2 of the travel motor 3 as a travel motor rotation speed are provided.

On the basis of various signals that have been input, the controller 101 executes a predetermined computation to control the operations of the engine 1, the generating motor 2, and the travel motor 3 and to control the states of the clutches c1 and c2. Furthermore, in this embodiment, an anti-lock braking system (ABS) is provided, and in addition to the above-described control, the controller 101 also controls the operation of the anti-lock braking system and outputs a control signal to a hydraulic pressure generation unit 301 for the anti-lock braking system. By increasing/decreasing the hydraulic for a brake caliper or a wheel cylinder, the anti-lock braking system automatically creates a braking behavior similar to that achieved by pumping of the brake performed by the driver.

In this embodiment, it is possible to switch a travelling mode between a series hybrid mode and an engine direct connected mode during an actual travelling. In the series hybrid mode, the travel motor 3 functions as a drive power source of the vehicle, and in the engine direct connected mode, the engine 1 essentially functions as the drive power source of the vehicle.

Figure 2:
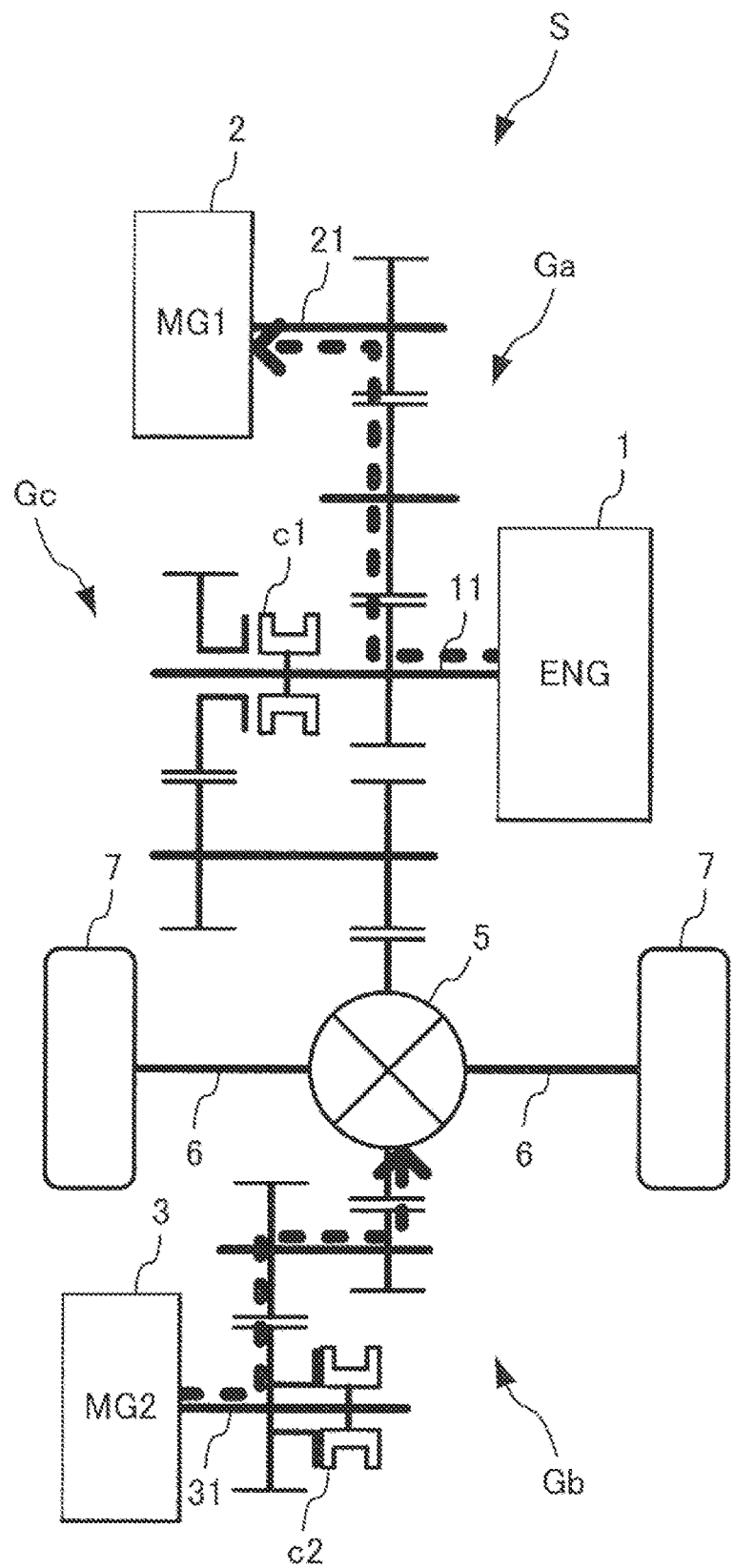
FIG. 2 is an explanatory diagram showing an operation of the drive system according to the above-described embodiment in a series hybrid mode.
Figure 3:
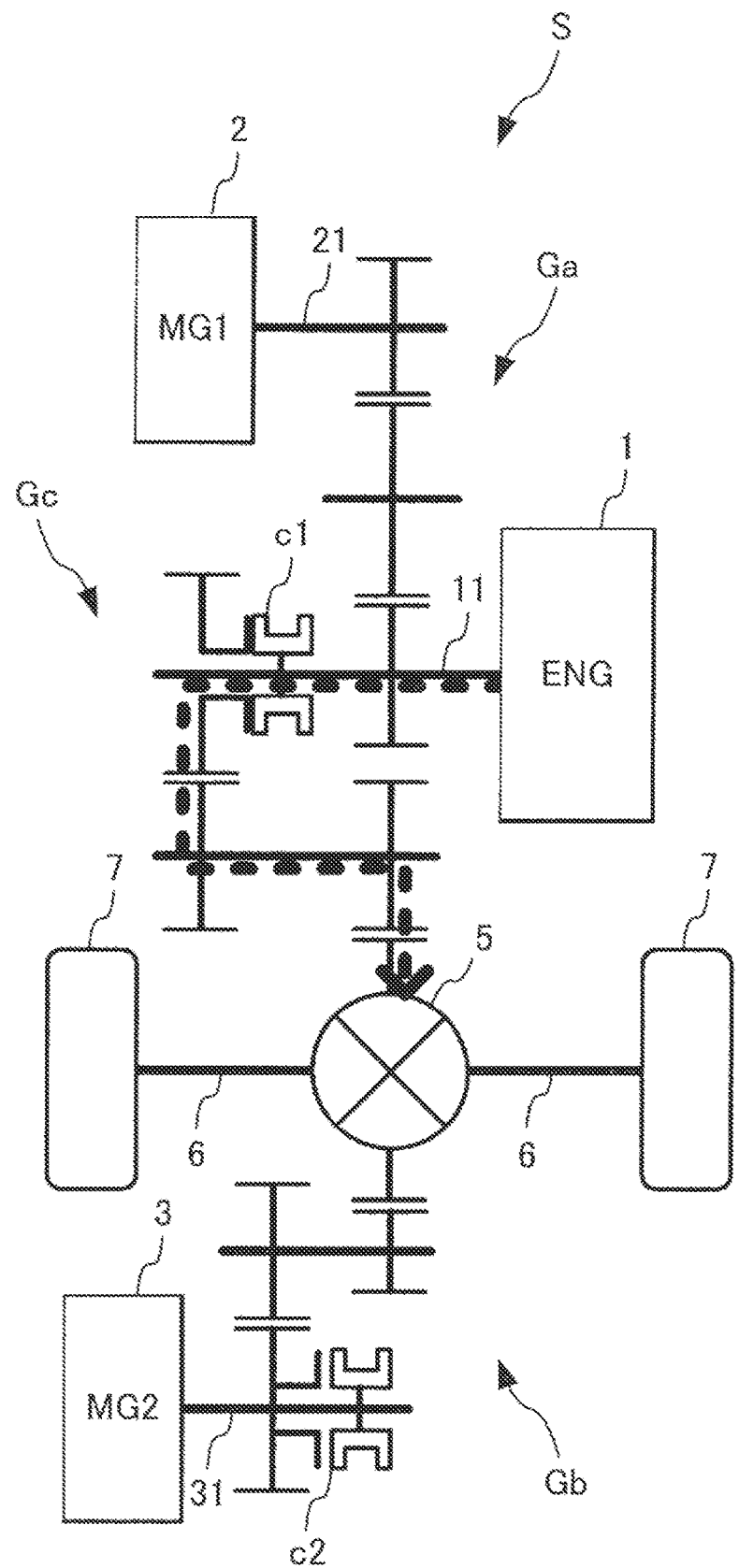
FIG. 3 is an explanatory diagram showing the operation of the drive system according to the above-described embodiment in an engine direct connected mode.

FIGS. 2 and 3 show the operations in accordance with the travelling modes of the drive system S, and FIG. 2 and FIG. 3 show the operation in the case of the series hybrid mode and the operation in the engine direct connected mode, respectively. In FIGS. 2 and 3, paths through which the motive force is transmitted are shown by thick dashed line arrows, and the arrows show the direction in which the motive force is transmitted.

In the series hybrid mode, as shown in FIG. 2, while the clutch c1 is disengaged, the clutch c2 is engaged such that the torque from the engine 1 can be transmitted to the generating motor 2 via the gear train Ga and such that the torque from the travel motor 3 can be transmitted to the differential 5 and the drive wheels 7 via the gear train Gb.

On the other hand, in the engine direct connected mode, as shown in FIG. 3, while the clutch c1 is engaged, the clutch c2 is disengaged such that the torque from the engine 1 can be transmitted to the differential 5 and the drive wheels 7 via the gear train Gc. In the above, because the clutch c2 located on a motive force transmission path connecting the travel motor 3 and the drive wheels 7 is cut off, the transmission of the motive force between the travel motor 3 and the drive wheels 7 is cut off, and therefore, the travel motor 3 is prevented from being forcedly rotated by the rotation of the drive wheels 7. In the engine direct connected mode, in a case in which the generating motor 2 is configured of the motor generator, not only the torque from the engine 1, but also the torque from the generating motor 2 can be transmitted to the drive wheels 7 via the gear trains Ga and Gc.

The switching between the series hybrid mode and the engine direct connected mode is executed by switching the engaged state and the disengaged state of the clutches c1 and c2 on the basis of the signal from the controller 101.

Figure 4:
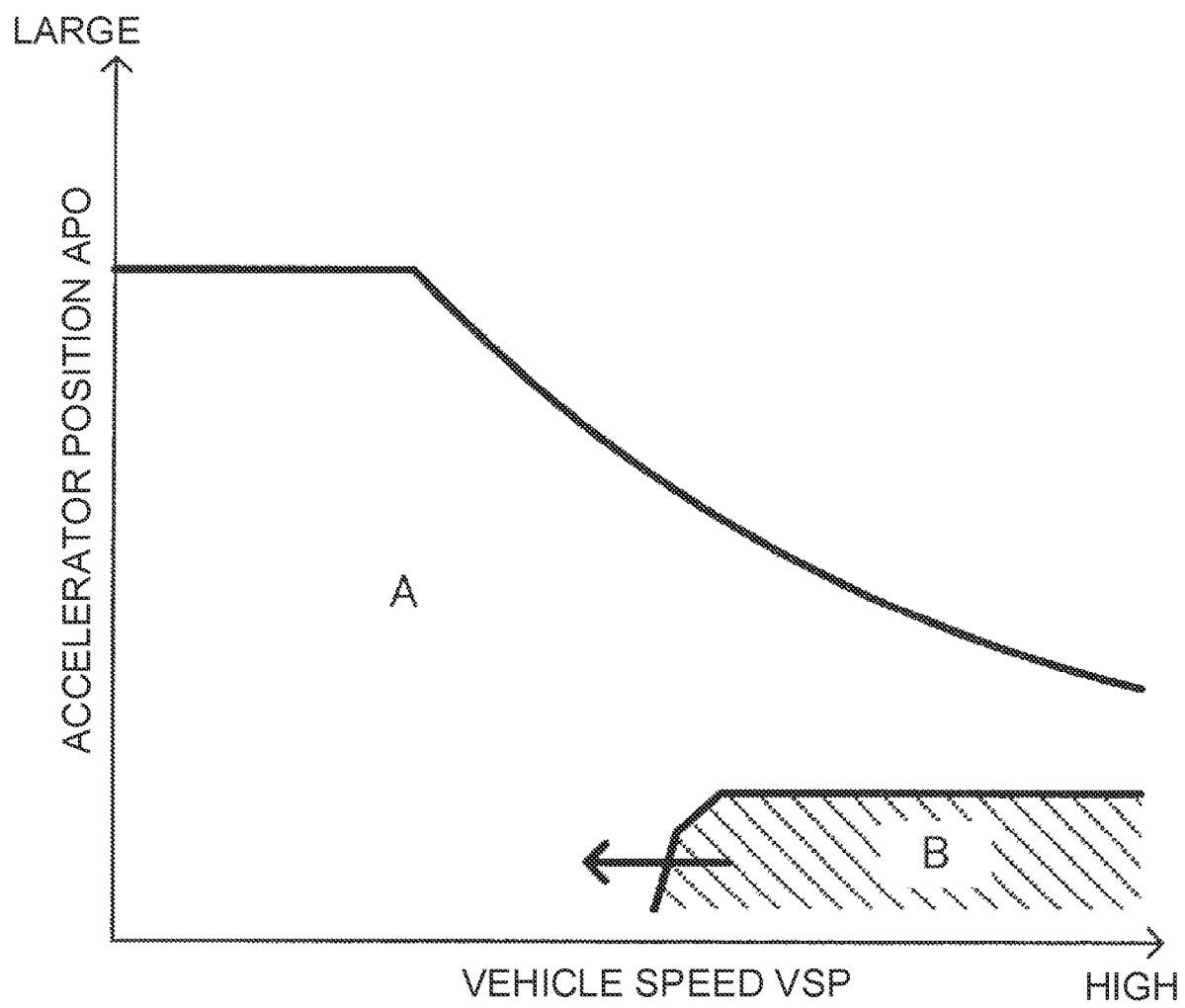
FIG. 4 is an explanatory diagram showing a travelling mode of the drive system according to the above-described embodiment in accordance with a driving region.

FIG. 4 shows the travelling mode of the vehicle according to a driving region.

Roughly speaking, the engine direct connected mode is selected in a high-speed region, and the series hybrid mode is selected in other regions. In this embodiment, the engine direct connected mode is selected in, especially, a region B in the high-speed region where the load is relatively low, and the series hybrid mode is selected in a region A other than the region B. The controller 101 determines the driving region A or B to which the driven state of the vehicle belongs on the basis of the vehicle speed VSP and the accelerator position APO and switches the travelling mode in accordance with the determination result.

A control for the switching of the travelling mode (hereinafter, referred to as "a mode switching control") will be described below. An overall flow of the control will be described with reference to a flowchart, and subsequently, the control will be described more specifically with reference to a time chart.

Figure 5:
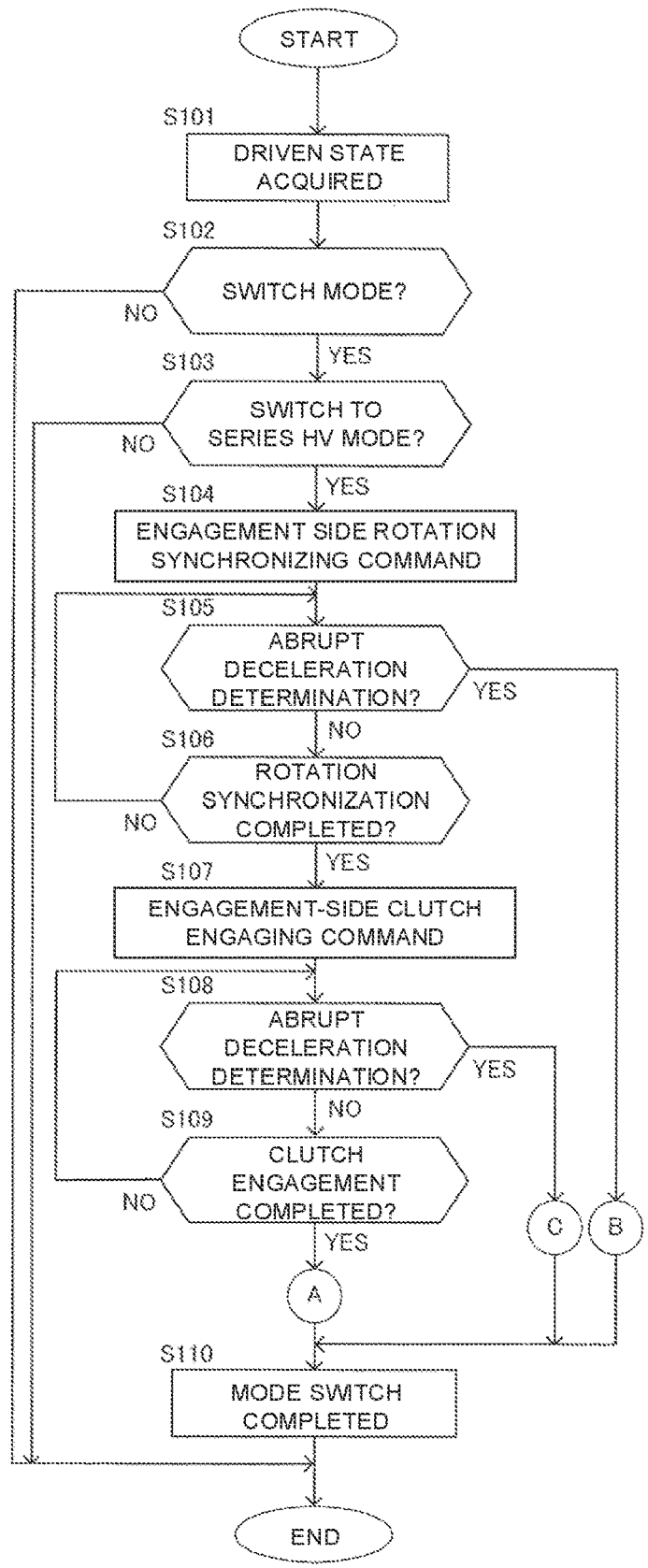
FIG. 5 is a flowchart showing an overall flow of a mode switching control according to the above-described embodiment.
Figure 6:
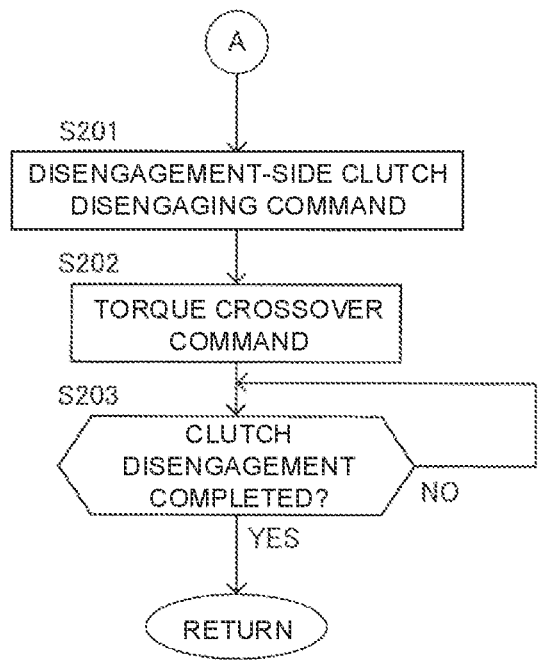
FIG. 6 is a flowchart showing details of processing (A) of a torque crossover phase in the mode switching control according to the above-described embodiment.
Figure 7:
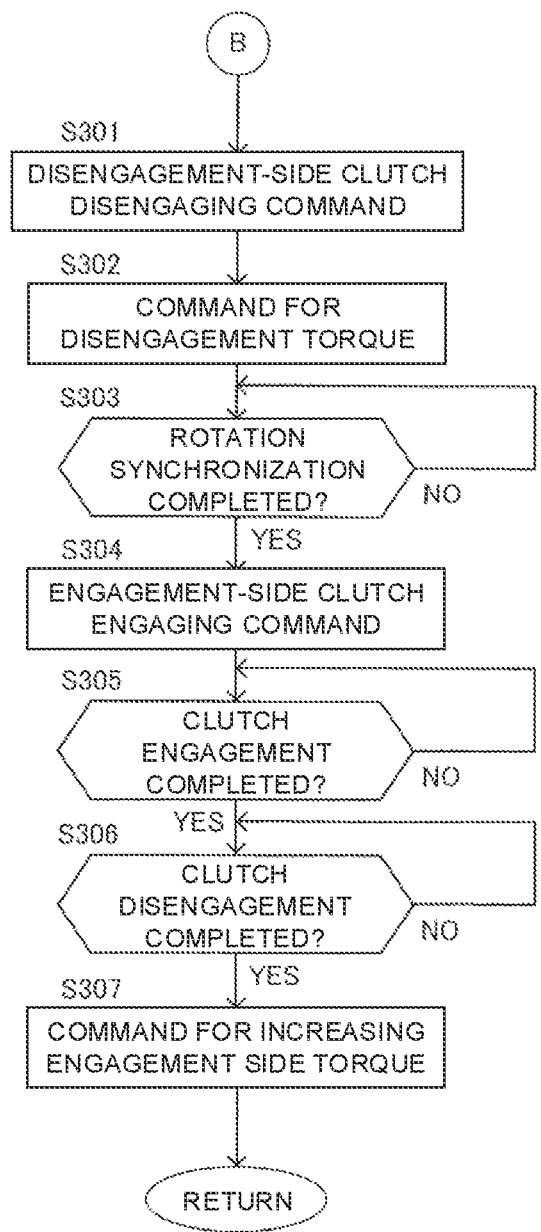
FIG. 7 is a flowchart showing details of processing (B) at non-synchronizable time in the mode switching control according to the above-described embodiment.

FIG. 5 shows the overall flow of the mode switching control, FIG. 6 shows details of processing (A) in a torque crossover phase in the mode switching control, FIG. 7 shows details of processing (B) at the non-synchronizable time, and FIG. 7 shows details of processing (C) at the non-synchronizable time. In this embodiment, the controller 101 is programed so as to execute the mode switching control at a predetermined period.

In the flowchart shown in FIG. 5, in S101, the driven states of the vehicle are acquired. Specifically, as the driven states for the mode switching control, the accelerator position APO, the vehicle speed VSP, the engine rotation speed Neng, the generating-motor rotation speed Nmg1, and the travel motor rotation speed Nmg2 are acquired.

In S102, it is determined whether or not it is the mode switching time. Specifically, it is determined whether or not the driven state of the vehicle defined by the accelerator position APO and the vehicle speed VSP has shifted from the region A in which the series hybrid mode is adopted to the region B in which the engine direct connected mode is adopted or, conversely, from the region B to the region A among the driving regions shown in FIG. 4. The processing proceeds to S103 when it is the mode switching time at which the driven state is shifted between the driving regions A and B, and the control by the routine at this time is finished when it is not the mode switching time.

In S103, it is determined whether or not the switching of the travelling mode is the switching from the engine direct connected mode to the series hybrid mode, in other words, it is determined whether or not the shift of the driving region is the shift from the region B to the region A. When it is the switching to the series hybrid mode, the processing proceeds to S104, and when it is not the switching to the series hybrid mode, but it is the switching to the engine direct connected mode, the control by the routine at this time is finished.

In S104, to an engagement-side clutch, a control (hereinafter, referred to as "a rotation synchronizing control") is started so as to match respective rotation speeds of a driving component and a driven component of the engagement-side clutch. In the above, the engagement-side clutch refers to the clutch that will be engaged after the mode switching (in other words, the clutch that is in the disengaged state before the mode switching), and in the switching from the engine direct connected mode to the series hybrid mode, the clutch corresponds to the clutch c2 provided for the gear train Gb. Then, as the rotation synchronizing control in this case, the torque is generated by the travel motor 3, and the travel motor rotation speed Nmg2 is increased.

In S105, a determination of abrupt deceleration is executed, and it is determined whether or not the rotation synchronization can be achieved, specifically, it is determined whether or not the rotation synchronization of the clutch c2 that is the engagement-side clutch is completed before the vehicle speed VSP is reduced to a predetermined vehicle speed VSP1 that defines a low speed region. When the rotation synchronization can be achieved, the processing proceeds to S106, and when the vehicle is determined to be in the abrupt deceleration time and the rotation synchronization cannot be achieved, the processing proceeds to S301 in the flowchart shown in FIG. 7. In this embodiment, whether or not the rotation synchronization can be achieved is determined on the basis of a degree of deceleration DEC of the vehicle. It is possible to employ derivative value of the vehicle speed VSP as the degree of deceleration DEC. Specifically, after the rotation synchronizing control has started, when the degree of deceleration DEC equal to or greater than a predetermined value DEC1 is detected, it is determined that the rotation synchronization cannot be achieved, in other words, it is determined that the vehicle is in the abrupt deceleration time at which the rotation synchronization is not completed before the speed is decelerated to the predetermined vehicle speed VSP1. The vehicle speed VSP1 that defines the low speed region is stated as the vehicle speed that defines the upper limit of a speed region before the vehicle is stopped at which vibration in the longitudinal direction is caused in the vehicle when the vehicle is decelerated while keeping the clutch c1 in an engaged state. In addition to derivation of the vehicle speed VSP, it is also possible to detect the degree of deceleration DEC by detecting the acceleration in the longitudinal direction of the vehicle by a longitudinal G sensor.

In S106, it is determined whether or not the rotation synchronization is completed. This determination is performed, for example, by determining whether or not the difference in the rotation speed between the driving component and the driven component of the engagement-side clutch is decreased to a predetermined value, and it is determined that the rotation synchronization is completed when the difference is decreased to a predetermined value. When the rotation synchronization is completed, the processing proceeds to S107, and when the rotation synchronization is not achieved, the processing returns to S105, and the determinations in S105 and 106 are repeated. The method of performing the determination as to whether or not the rotation synchronization is completed is not limiter thereto, and it is also possible to perform the determination by determining whether or not a state in which the difference in the rotation speed is equal to or smaller than a predetermined value is continued for a predetermined period.

In S107, a command for engaging the engagement-side clutch is output. In a case in which the clutches c1 and c2 convert the action of an actuator (for example, a servo-type electric motor) to the movement of the driving component or the driven component via a linkage formed of a cam, a lever, and so forth, the command for operating the actuator so as to engage the clutch is output to the actuator.

Figure 8:
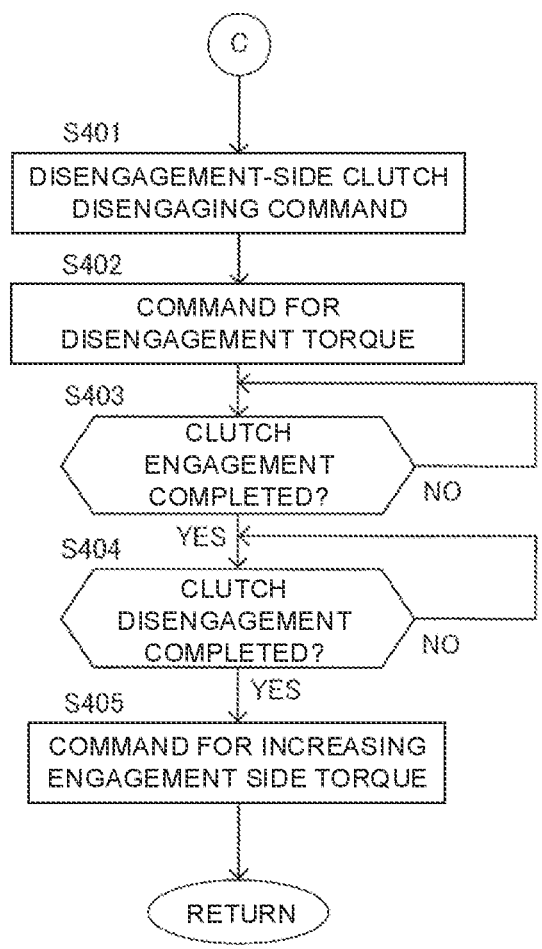
FIG. 8 is a flowchart showing details of processing (C) at the non-synchronizable time in the mode switching control according to the above-described embodiment.

In S108, the determination of the abrupt deceleration is executed by the processing similar to that in S105, and when the degree of deceleration DEC equal to or greater than the predetermined value DEC1 is detected before the engagement of the clutch is completed, the vehicle is determined to be in the abrupt deceleration time by the abrupt deceleration caused after the completion of the rotation synchronization, and the processing proceeds to S401 in the flowchart shown in FIG. 8. When the vehicle is not determined to be in the abrupt deceleration time, the processing proceeds to S109.

In S109, it is determined whether or not the engagement of the clutch is completed. This determination can be performed, for example, by determining whether or not the actuator (specifically, a movable part thereof) of the clutches c1 and c2 has reached the target position during the engagement. When the engagement of the clutch is completed, in order to execute the processing in the torque crossover phase, the processing proceeds to S201 in the flowchart shown in FIG. 6, and when the engagement of the clutch is not completed, the determinations in S108 and 109 are repeated until the engagement is completed.

In S110, it is determined that the switching of the travelling mode is completed, and subsequently, the processing by the routine at this time is finished.

The processing proceeds to the flowchart showing FIG. 6, and in S201, a command for disengaging a disengagement-side clutch is output. For example, the command for operating the actuator of the clutches c1 and c2 so as to disengage the clutch is output to the actuator. In the above, the disengagement-side clutch refers to the clutch that will be disengaged after the mode switching (in other words, the clutch that is in the engaged state before the mode switching), and for example, in the switching from the engine direct connected mode to the series hybrid mode, the clutch corresponds to the clutch c1 provided for the gear train Gc.

In S202, to the drive power source before the mode switching and the drive power source after the mode switching, a control in which the torque is crossed over between these drive power sources is started. For the sake of convenience of description, this will be described for an example in which, when the engine direct connected mode is switched to the series hybrid mode, in addition to the engine 1, the torque is also generated by the generating motor 2 before the mode switching. In this example, the crossover of the torque is realized as a control in which the torque generated by the generating motor 2, which is the drive power source before the mode switching, is decreased, and the torque from the travel motor 3, which is the drive power source after the mode switching, is increased in a corresponding manner.

In S203, it is determined whether or not the disengagement of the clutch is completed. This determination can be performed, for example, by determining whether or not the actuator (specifically, the movable part thereof) of the clutches c1 and c2 has reached the target position during the disengagement. When the disengagement of the clutch is completed, the processing returns to the flowchart in FIG. 5, and when the disengagement of the clutch is not completed, the determination in S203 is repeated until the disengagement is completed.

In the flowchart shown in FIG. 7, in S301, a command for disengaging the clutch c1 that is the disengagement-side clutch is output to the clutch c1. In other words, when it is determined that the rotation synchronization of the clutch c2 that is the engagement-side clutch is not completed before the vehicle speed VSP is reduced to the predetermined vehicle speed VSP1 and that the rotation synchronization cannot be achieved, regardless of whether or not the engagement of the clutch c2 is completed, the command for disengaging the clutch c1 is output, and the operation for disengaging the clutch c1 is started.

In S302, a command for generating the torque for disengaging the clutch c1 is output to the generating motor 2. Specifically, the torque from the generating motor 2 is controlled such that the torque transmitted by the clutch c1 toward the drive wheels 7 becomes zero.

In S303, it is determined whether or not the rotation synchronization is completed. When the rotation synchronization is completed, the processing proceeds to S304, and when the rotation synchronization is not completed, the determination in S303 is repeated until the rotation synchronization is completed.

In S304, a command for engaging the clutch c2 that is the engagement-side clutch is output to the clutch c2.

In S305, it is determined whether or not the engagement of the clutch c2 is completed. When the engagement of the clutch c2 is completed, the processing proceeds to S306, and when the engagement of the clutch c2 is not completed, the determination in S305 is repeated until the engagement is completed.

In S306, it is determined whether or not the disengagement of the clutch c1 has already been completed. When the disengagement of the clutch c1 has already been completed, the processing proceeds to S307, and when the disengagement of the clutch c1 has not been completed, the processing stands by until the disengagement is completed.

In S307, the torque transmitted to the drive wheels 7 via the clutch c2, in other words, the torque from the travel motor 3 is increased.

The flowchart shown in FIG. 8 corresponds to the flowchart shown in FIG. 7 from which the processing in S303 and 304 is omitted. In the flowchart in FIG. 8, the command for disengaging the clutch c1 is output to the clutch c1 in S401, and thereby, the operation is started toward the disengagement of the clutch c1. Next, in S402, a command for generating the torque for disengaging the clutch c1 is output to the generating motor 2. When it is determined that the engagement of the clutch c2 is completed in S403 and when it is determined that the disengagement of the clutch c1 has already been completed in following S404, the processing proceeds to S405, and thereby, the torque transmitted to the drive wheels 7 via the clutch c2, in other words, the torque from the travel motor 3 is increased.

Figure 9:
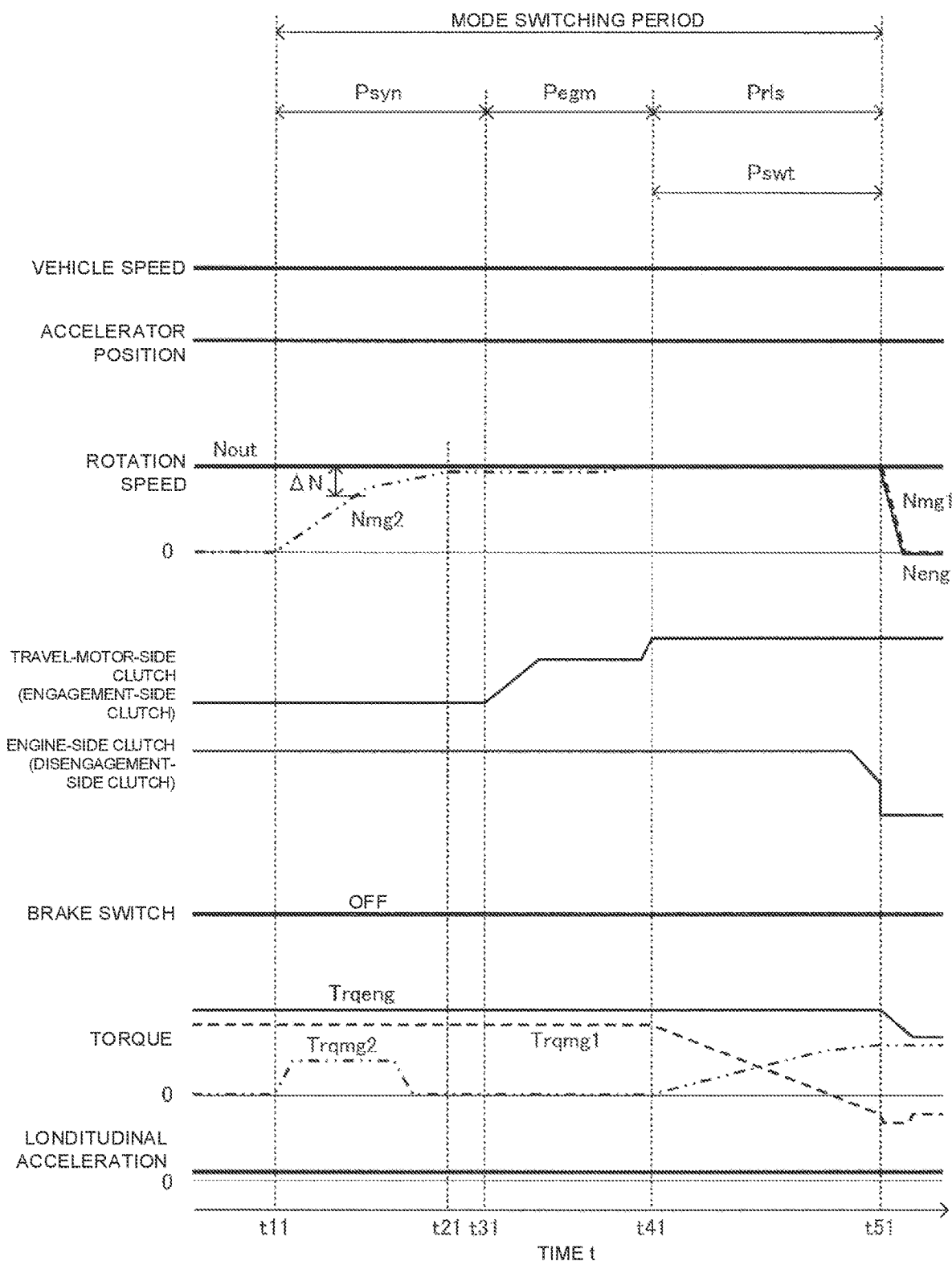
FIG. 9 is an explanatory diagram showing the operation at normal time by the mode switching control according to the embodiment of the present invention at switching time from the engine direct connected mode to the series hybrid mode.
Figure 10:
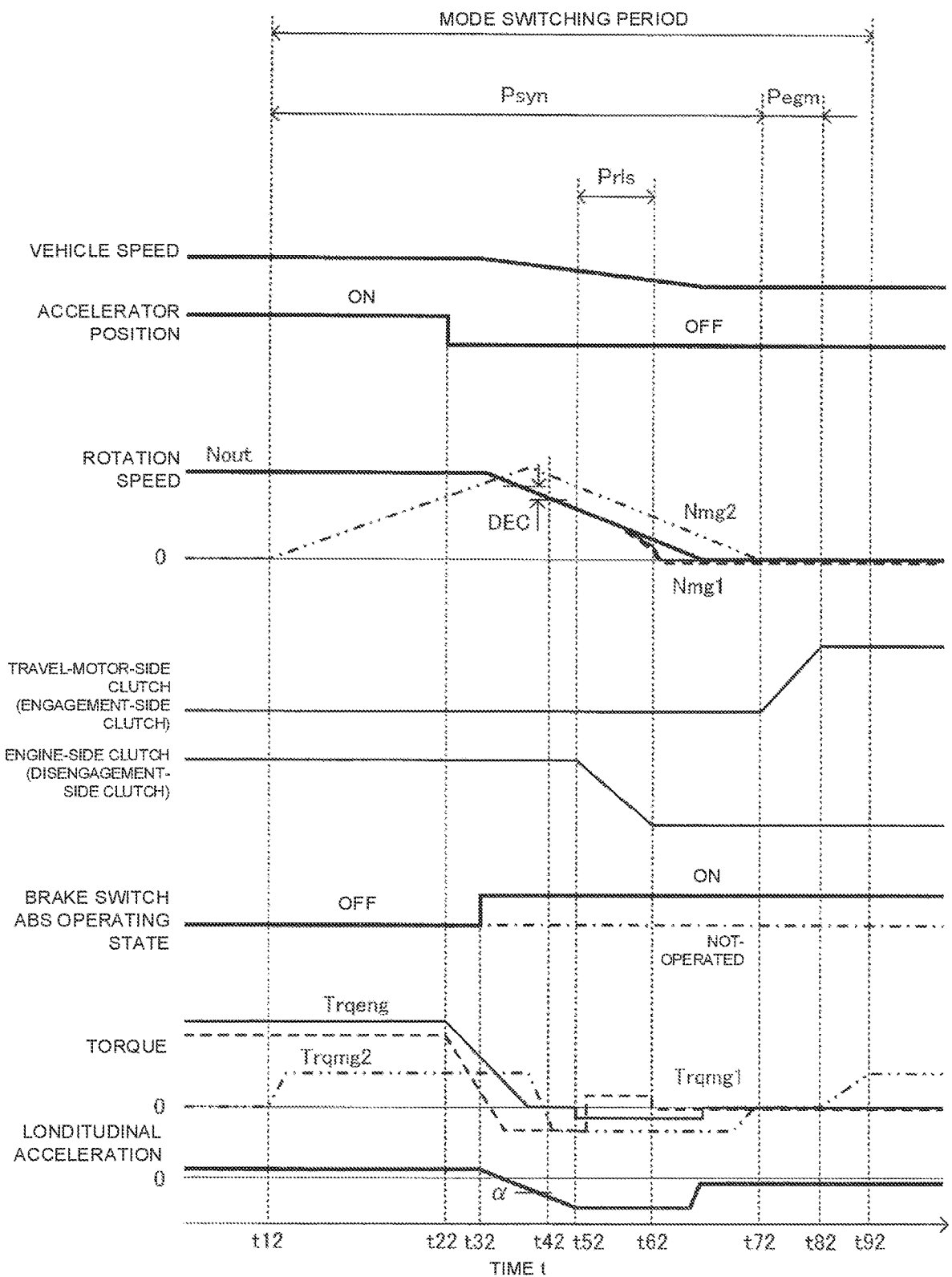
FIG. 10 is an explanatory diagram showing an example of the operation by the mode switching control, in a case in which deceleration is caused during the switching, at the switching time from the engine direct connected mode to the series hybrid mode.

Now, the description will be given with reference to time charts. FIGS. 9 and 10 show an operation of a drive unit S at the time of switching from the engine direct connected mode to the series hybrid mode by the mode switching control according to this embodiment, FIG. 9 shows the operation at a normal time at which the rotation synchronization of the clutch c2 that is the engagement-side clutch can be achieved, and FIG. 10 shows the operation at the non-synchronizable time at which the rotation synchronization of the clutch c2 cannot be achieved. In FIGS. 9 and 10, rotation speed N and torque Trq of the engine 1, the generating motor 2, and the travel motor 3 are shown by solid lines, dashed lines, and two-dot chain lines, respectively (the same applies to FIGS. 10 to 12 which will be described below).

At the normal time (see FIG. 9), after it is determined that it is the switching time from the engine direct connected mode to the series hybrid mode (time t11), the rotation synchronizing control to the clutch c2 is started (a rotation synchronizing phase Psyn), and a torque Trqmg2 is generated by the travel motor 3 to increase the travel motor rotation speed Nmg2, thereby causing the travel motor rotation speed Nmg2 to approach the output rotation speed Nout corresponding to the rotation speed of the driving shafts 6. When difference $\Delta N$ (=Nout−Nmg2) between the output rotation speed Nout and the travel motor rotation speed Nmg2 is decreased to a predetermined value (time t21) or when a state in which the difference $\Delta N$ for the rotation speed is equal to or lower than a predetermined value is continued for a predetermined period (time t31), it is determined that the rotation synchronization is completed and the phase shifts to a clutch engagement phase Pegm to engage the clutch c2. In the clutch engagement phase Pegm, the torque Trqmg2 of the travel motor 3 is decreased to zero. When the engagement of the clutch c2 is completed (time t41), the phase shifts to the torque crossover phase Pswt. Then, the torque transmitted to the drive wheels 7 via the clutch c1 is decreased, and on the other hand, the torque transmitted to the drive wheels 7 via the clutch c2 is increased in a corresponding manner. Specifically, while decreasing a torque Trqmg1 from the generating motor 2 at a predetermined rate of decrease $\Delta Tdec$, the torque Trqmg2 of the travel motor 3 is increased at a predetermined rate of increase $\Delta Tinc$ that corresponds to the rate of decrease $\Delta Tdec$. In this embodiment, the rate of increase $\Delta Tinc$ and the rate of decrease $\Delta Tdec$ are set to the equal value with each other. Furthermore, in the course of the torque crossover phase Pswt, the torque Trqmg1 from the generating motor 2 becomes smaller than zero, and a part of a torque Trqeng from the engine 1 is consumed for regeneration by the generating motor 2, and therefore, the rate of increase $\Delta Tinc$ of the torque Trqmg2 of the travel motor 3 is changed to a smaller value. Then, it is determined that the crossover of the torque is completed when the torque Trqmg2 of the travel motor 3 is increased to the target value after the mode switching (time t51), and the mode switching control is finished when the disengagement of the clutch c1 is achieved as the torque applied to the clutch c1 is decreased to zero.

At the non-synchronizable time (see FIG. 10), after it is determined that it is the switching time from the engine direct connected mode to the series hybrid mode (time t12), similarly to the case for the normal time, the rotation synchronizing control to the clutch c2 is started (the rotation synchronizing phase Psyn), and the torque Trqmg2 is generated by the travel motor 3 to increase the travel motor rotation speed Nmg2, thereby causing the travel motor rotation speed Nmg2 to approach the output rotation speed Nout. In the above, at the normal time, when the difference $\Delta N$ between the output rotation speed Nout and the travel motor rotation speed Nmg2 is decreased to a predetermined value or when the state in which the difference $\Delta N$ for the rotation speed is equal to or lower than a predetermined value is continued for a predetermined period, it is determined that the rotation synchronization is completed; however, in the example shown in FIG. 10, the accelerator pedal is returned at time t22 before the rotation synchronization of the clutch c2 is completed and the accelerator position APO is decreased, and in following time t32, a brake pedal is applied by the driver. For such a decelerating operation, in this embodiment, the degree of deceleration DEC of the vehicle is detected, and it is determined whether or not the rotation synchronization of the clutch c2 can be achieved on the basis of the detected the degree of deceleration DEC. Specifically, when the degree of deceleration DEC equal to or greater than the predetermined value DEC1 is detected (time t42) or when the degree of deceleration DEC equal to or greater than the predetermined value DEC1 is detected over a predetermined period (time 52), it is determined that the rotation synchronization is not completed before the vehicle speed is decelerated to the predetermined vehicle speed VSP1 and that the rotation synchronization cannot be achieved. The detection of the degree of deceleration DEC can also be achieved by the derivation of the vehicle speed VSP and by detection of the longitudinal acceleration a of the vehicle. In this case, it is determined that the rotation synchronization cannot be achieved when the backward acceleration a (<0) equal to or greater than a predetermined value is detected or when the backward acceleration a that is equal to or greater than a predetermined value is detected over a predetermined period. When it is determined that the rotation synchronization is not completed before the vehicle speed is decelerated to the predetermined vehicle speed VSP1, regardless of whether or not the engagement of the clutch c2 is completed, the phase shifts to a clutch disengaged phase Prls, and the command for disengaging the clutch c1 is output. In this embodiment, in the clutch disengaged phase Prls, the command for operating the actuator of the clutch c1 so as to disengage the clutch c1 is output to the actuator of the clutch c1, and the generating motor 2 generates the torque Trqmg1 for compensating the load applied to the clutch c1 by the engine 1 by the fuel cut off. Then, when the vehicle is stopped and the travel motor rotation speed Nmg2 matches the output rotation speed Nout (=0), it is determined that the rotation synchronization of the clutch c2 has been achieved (time t72), and the command for engaging the clutch c2 is output. After the engagement of the clutch c2 is completed (time t82), the torque Trqmg2 of the travel motor 3 is increased to the target value in accordance with the total driving torque after the mode switching, and a motor switching control is finished (time t92).

Figure 13:
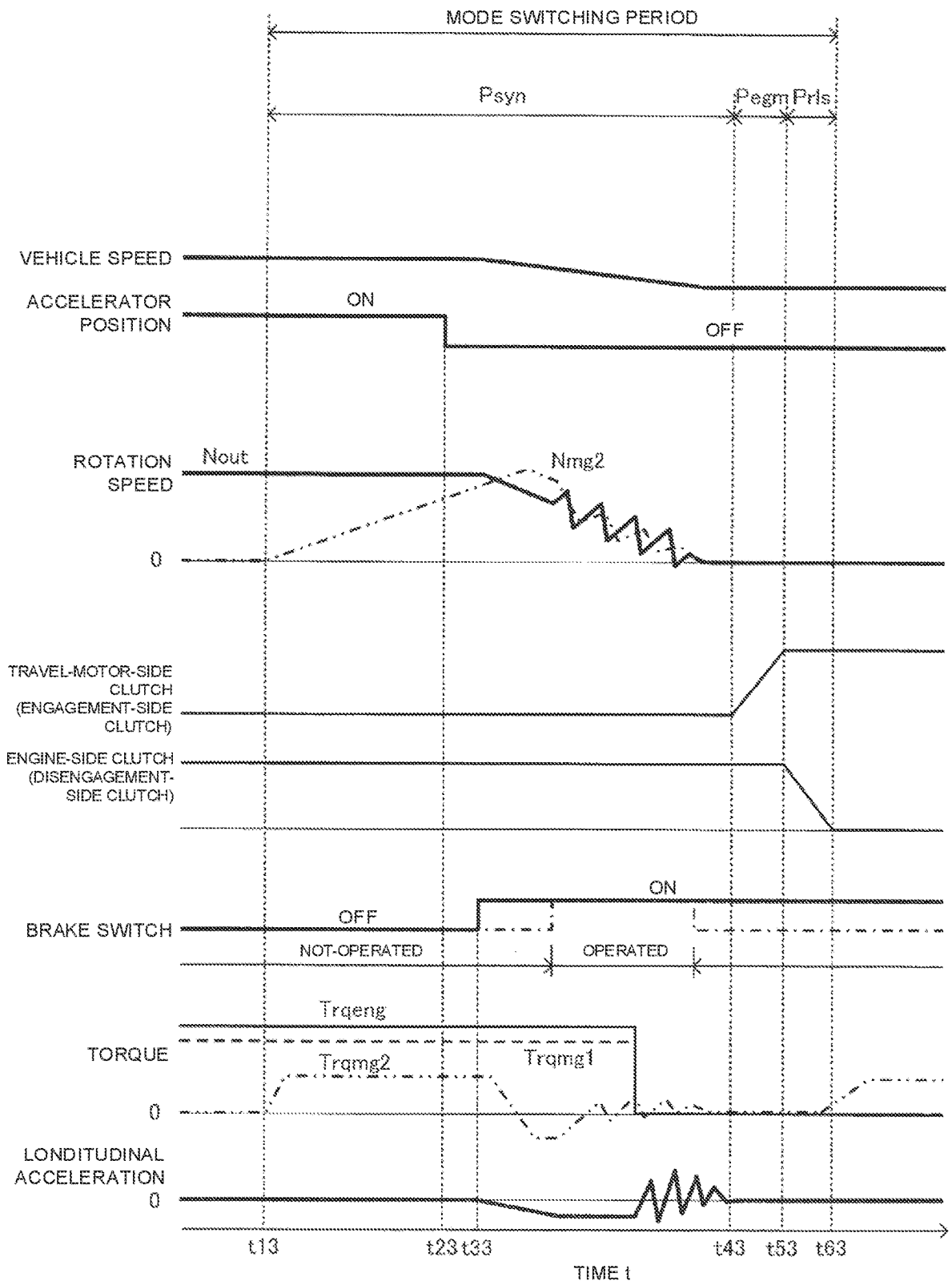
FIG. 13 is an explanatory diagram showing a comparative example, in a case in which deceleration is caused during the switching, at the switching time from the engine direct connected mode to the series hybrid mode.

FIG. 13 shows an operation by a comparative example at the time of switching from the engine direct connected mode to the series hybrid mode. In the comparative example, a control in which, regardless of whether or not the rotation synchronization of the clutch c2 is completed (in other words, regardless of whether or not the rotation synchronization can be achieved) before the vehicle speed is decelerated to the predetermined vehicle speed VSP1 in response to the application of the brake pedal, the clutch c2 that is the engagement-side clutch is engaged, and thereafter, the clutch c1 that is the disengagement-side clutch is disengaged is executed.

When the decrease in the travel motor rotation speed Nmg2 cannot follow the decrease in the output rotation speed Nout in response to the application of the brake pedal (time t33) and a reasonable amount of time is required for the rotation synchronization of the clutch c2, the vehicle is over decelerated beyond the predetermined vehicle speed VSP1 in a state in which the clutch c1 linking the engine 1 and the drive wheels 7 is kept engaged. As a result, vibration due to the fluctuation in the rotation of the engine 1 before stopping is transmitted to a vehicle body, and thereby, the drivability is deteriorated. This vibration is shown in FIG. 13 as the fluctuation of the longitudinal acceleration.

The problems due to the time requirement for the rotation synchronization of the clutch c2 are also applicable in a case in which the brake pedal is applied hard (time t33) and the anti-lock braking system is operated during mode switching. As the anti-lock braking system is operated, brake hydraulic pressure is repeatedly supplied/discharged by the hydraulic pressure generation unit 301, causing vibration to the output rotation speed Nout. As a result, the travel motor rotation speed Nmg2 cannot be controlled to follow this fluctuation, and the clutch c1 is kept in the engaged state until the vibration is ceased after the vehicle is stopped.

There is also a concern that parts are damaged when resonance is caused in a vibration system.

In contrast, in this embodiment, when it is determined that the rotation synchronization of the clutch c2 cannot be achieved, regardless of whether or not the engagement of the clutch c2 is completed, the clutch c1 is disengaged, and therefore, the engine 1 and the drive wheels 7 are prevented from being kept in linked state even if the vehicle is over decelerated beyond the predetermined vehicle speed VSP1.

(Description of Operational Advantages)

The drive system S of the electric vehicle according to this embodiment is configured as described above, and the effects achieved by this embodiment will be described below.

Firstly, at the mode switching time from the engine direct connected mode to the series hybrid mode involving the deceleration, when the rotation synchronization of the clutch c2 that is the engagement-side clutch is not completed before the vehicle speed is decelerated to the predetermined vehicle speed VSP1, regardless of whether or not the engagement of the clutch c2 is completed, by disengaging the clutch c1 that is the disengagement-side clutch, it is possible to ensure the drivability by avoiding the over deceleration beyond the predetermined vehicle speed VSP1 in a state in which the clutch c1 linking the engine 1 and the drive wheels 7 is kept engaged and by suppressing the occurrence of the vibration in the vehicle in the low speed region before stopping.

Secondly, it is determined whether or not the rotation synchronization of the clutch c2 is completed before the vehicle speed is decelerated to the predetermined vehicle speed VSP1, in other words, whether or not the rotation synchronization can be achieved, and the disengagement of the clutch c1 before the engagement of the clutch c2 is performed in accordance with the determination result, and therefore, it is possible to more suitably perform the disengagement of the clutch c1.

In the above, whether or not the rotation synchronization can be achieved can be suitably determined on the basis of the degree of deceleration DEC of the vehicle.

On the basis of a rate of change or the derivative value of the vehicle speed VSP, it is possible to determine the degree of deceleration DEC by the vehicle speed sensor 202 that is already available as that widely provided in the electric vehicle. Furthermore, on the basis of the longitudinal acceleration of the vehicle, the degree of deceleration DEC can be determined more directly, and therefore, it is possible to reduce a computational load.

(Description of Another Embodiment)

In the above description, it is determined whether or not the rotation synchronization of the clutch c2 that is the engagement-side clutch is completed before the vehicle speed is decelerated to the predetermined vehicle speed VSP1 on the basis of the degree of deceleration DEC of the vehicle. However, this determination can be performed not only on the basis of the degree of deceleration DEC, but also on the basis of an operational state of the anti-lock braking system and the vehicle speed VSP.

Figure 11:
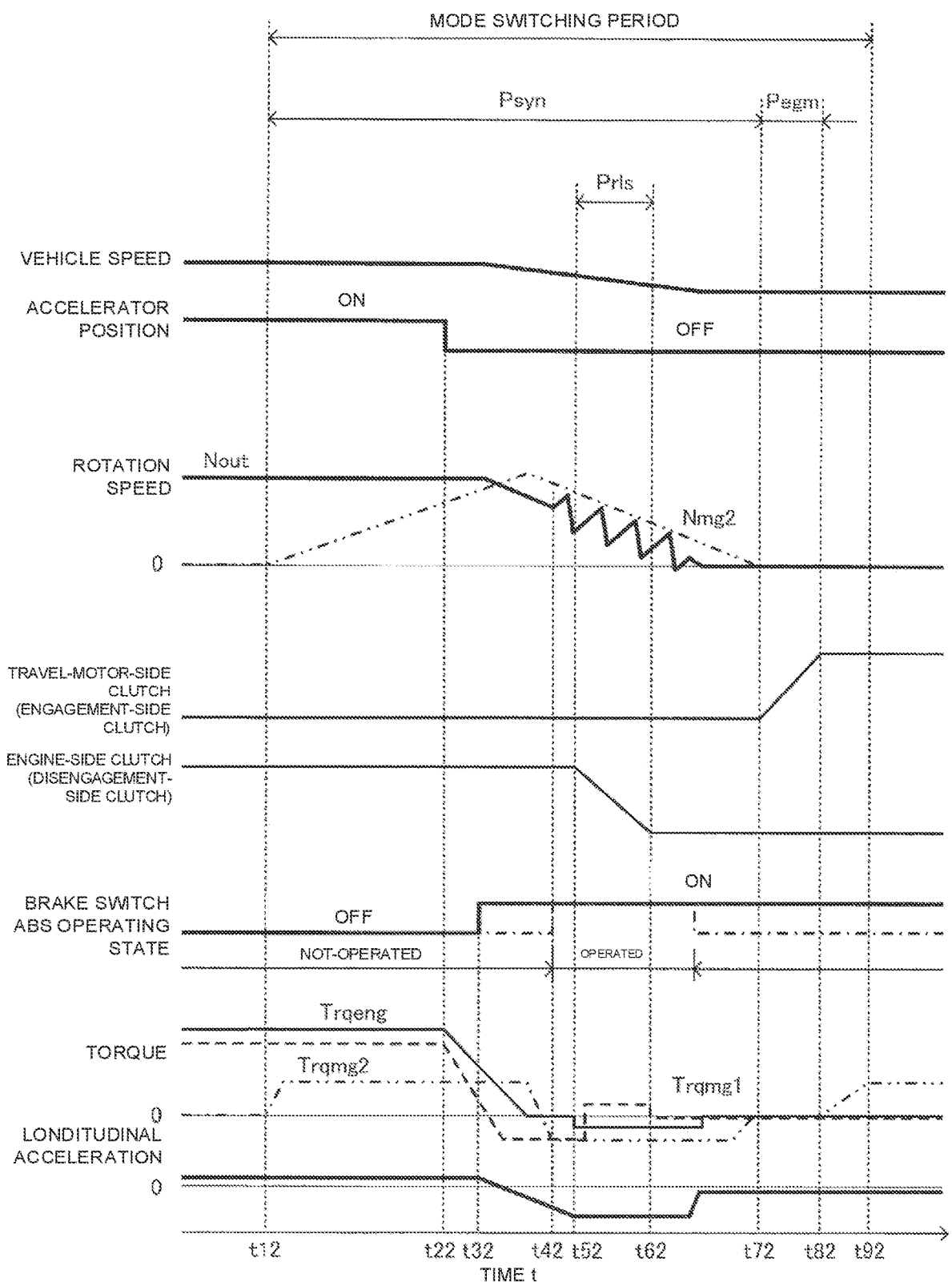
FIG. 11 is an explanatory diagram showing another example of the operation by the mode switching control, in a case in which deceleration is caused during the switching, at the switching time from the engine direct connected mode to the series hybrid mode.

As another embodiment of the present invention, FIG. 11 shows, as an example, the operation of the drive unit S at the time of switching from the engine direct connected mode to the series hybrid mode in a case in which the anti-lock braking system is operated by the application of the brake pedal during the mode switching. The configuration of the drive unit S and a basic flow of the mode switching control executed by the controller 101 according to this embodiment may be the same as those in the above-described embodiment, and specifically, the configuration is the same as that shown in FIG. 1 and the basic flow of the mode switching control is the same as that shown in FIG. 5.

In this embodiment, after it is determined that it is the switching time from the engine direct connected mode to the series hybrid mode (time t12), the accelerator pedal is returned by the driver in the course of the rotation synchronizing phase Psyn (time t22), and furthermore, the brake pedal is applied hard (time t32). FIG. 11 shows a situation in which the output rotation speed Nout is fluctuated up and down by the operation of the anti-lock braking system in response to the hard application of the brake pedal (time t42).

In this embodiment, when the operation of the anti-lock braking system is detected (time t42) on the basis of the rate of change of the output rotation speed Nout (in other words, the rotation speed of the drive wheels 7), brake hydraulic pressure generated by the hydraulic pressure generation unit 301 for the brake caliper or the wheel cylinder, and so forth, or when the operation of the anti-lock braking system is continued for a predetermined period (time t52), it is determined that the rotation synchronization of the clutch c2 is not completed before the vehicle speed is decelerated to the predetermined vehicle speed VSP1 and the rotation synchronization cannot be achieved, and the clutch c1 is disengaged. After the disengagement of the clutch c1 is completed (time t62), similarly to the above-described embodiment, the clutch c2 is engaged (time t82)

According to this embodiment, under a situation in which the anti-lock braking system is operated, it is possible to determine, without delay, whether or not the rotation synchronization of the clutch c2 can be achieved on the basis of the operating state of the anti-lock braking system.

Figure 12:
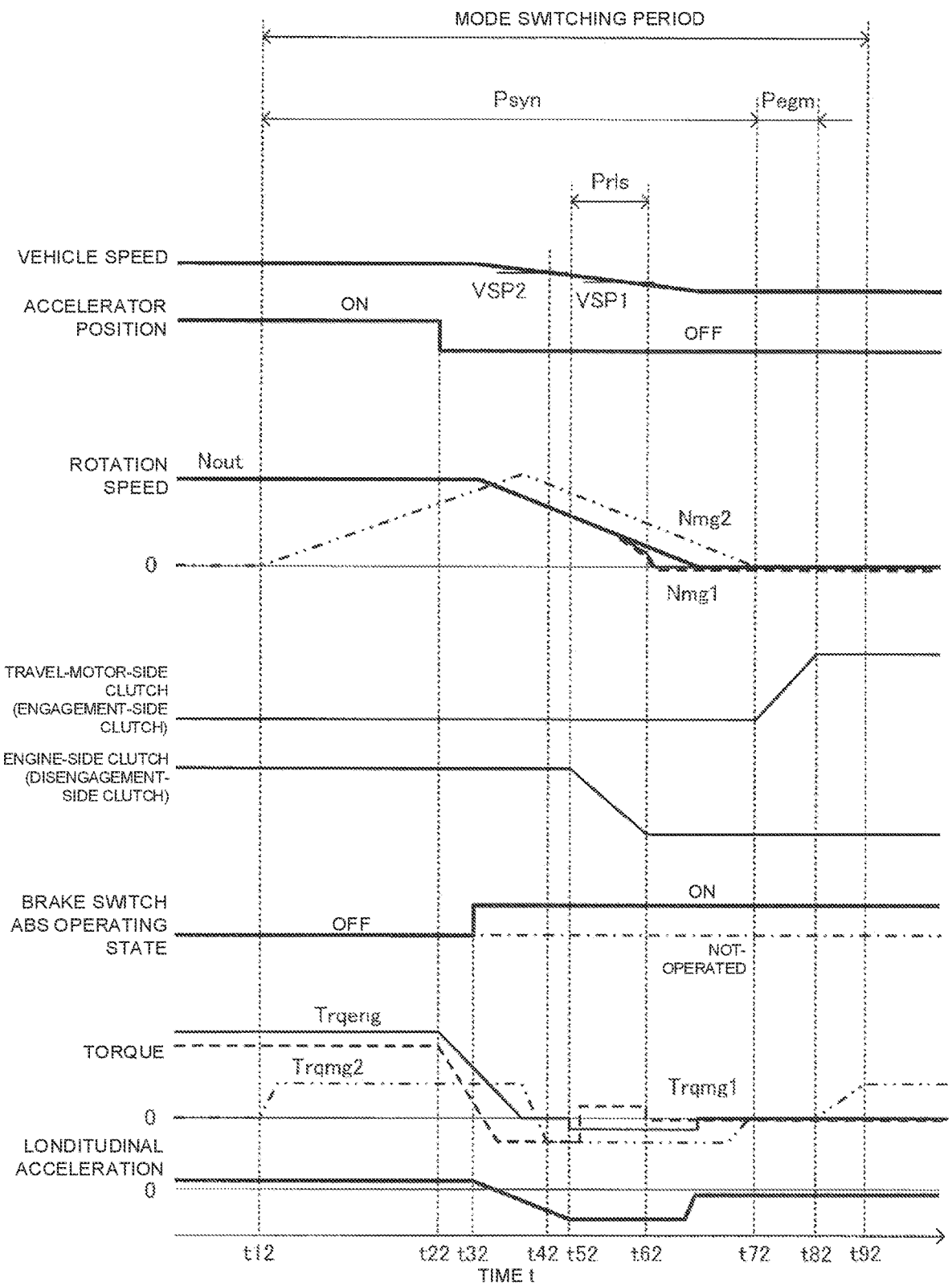
FIG. 12 is an explanatory diagram showing further example of the operation by the mode switching control, in a case in which deceleration is caused during the switching, at the switching time from the engine direct connected mode to the series hybrid mode.

As a further embodiment of the present invention, FIG. 12 shows, as an example, the operation of the drive unit S at the time of switching from the engine direct connected mode to the series hybrid mode in a case in which the change in the travel motor rotation speed Nmg2 cannot follow the decrease in the output rotation speed Nout due to deceleration although the anti-lock braking system is not operated. The configuration of the drive unit S and a basic flow of the mode switching control executed by the controller 101 according to this embodiment may also be the same as those in the above-described embodiment.

In this embodiment, after it is determined that it is the switching time from the engine direct connected mode to the series hybrid mode (time t12), the accelerator pedal is returned by the driver in the course of the rotation synchronizing phase Psyn (time t22), and the brake pedal is applied (time t32). For the deceleration by the application of the brake pedal, if the clutch c1 is to be disengaged by waiting for the slow down of the output rotation speed Nout and the engagement of the clutch c2, the clutch c1 linking the engine 1 and the drive wheels 7 is kept in the engaged state even if the vehicle is over decelerated beyond the predetermined vehicle speed VSP1 due to the delay in the rotation synchronization of the clutch c2.

In this embodiment, a predetermined second vehicle speed VSP2 that is higher than the vehicle speed VSP1 is set, and after the rotation synchronization is started (time t12), when the vehicle speed VSP is lowered to the predetermined second vehicle speed VSP2 while the rotation synchronization is not completed (time t42) or when the vehicle speed VSP equal to or lower than the predetermined second vehicle speed VSP2 is continued for a predetermined period (time t52), it is determined that the rotation synchronization cannot be achieved, and the clutch c1 is disengaged. After the disengagement of the clutch c1 is completed (time t62), the clutch c2 is engaged (time t82) in a similar manner as in the above-described embodiment. The second vehicle speed VSP2 is the vehicle speed obtained by adding a predetermined marginal allowance to the vehicle speed (VSP1) defining the upper limit of the speed region before stopping, for example.

According to this embodiment, by using the vehicle speed sensor 202 that is widely provided in the electric vehicle, while suppressing a number of parts, it is possible to determine whether or not the rotation synchronization can be achieved and to ensure the drivability.

Although it is possible to determine whether or not the rotation synchronization can be achieved on the basis of the degree of deceleration DEC of the vehicle, it is possible to determine the degree of deceleration DEC not only on the basis of the rate of change of the vehicle speed VSP or the longitudinal acceleration a of the vehicle, but also on the basis of a pedal pressure exerted on the brake pedal. By doing so, the determination of the degree of deceleration DEC of the vehicle becomes easier.

Although the embodiments of the present invention have been described in the above, the above-described embodiments merely illustrate a part of application examples of the present invention, and the technical scope of the present invention is not intended to be limited to the specific configurations in the above-described embodiments. Note that, it is possible to make various changes and modifications to the above-described embodiment within the scope of the claim.

The invention claimed is:

1. A control method of an electric vehicle provided with:
an internal combustion engine;
a generating motor provided configured to generate electricity by receiving motive force from the internal combustion engine; and
a travel motor configured to be driven by electric power generated by the generating motor,
wherein the internal combustion engine and a drive wheel are linked via a first clutch so as to be unlinkable/linkable, and the travel motor and the drive wheel are connected with a motive force transmission path on which a second clutch is located, and a travel motor side of the motive force transmission path and a drive wheel side of the motive force transmission path are linked via the second clutch so as to be unlinkable/linkable, and and
the electric vehicle being configured to switch between a series hybrid mode and an engine direct connected mode, the series hybrid mode being a mode in which the travel motor is used as a drive power source such that the electric vehicle travels by transmitting motive force from the travel motor to the drive wheel, the engine direct connected mode being a mode in which at least one of the internal combustion engine and the generating motor is used as a drive power source such that the electric vehicle travels by transmitting motive force from the drive power source to the drive wheel,
wherein
at a mode switching time from the engine direct connected mode to the series hybrid mode, starting a rotation synchronization matching a rotation speed of the travel motor side of the motive force transmission path and a rotation speed of the drive wheel side of the motive force transmission path, and engaging the travel motor side of the motive force transmission path and the wheel side of the motive force transmission path by the second clutch after completing the rotation synchronization, and wherein
at the mode switching time involving deceleration, when the rotation synchronization or an engagement by the second clutch is not completed before a vehicle speed is decelerated to a predetermined vehicle speed, the first clutch is disengaged before the engagement by the second clutch is completed.

2. The control method of the electric vehicle according to claim 1, wherein it is determined whether or not the rotation synchronization or the engagement by the second clutch is completed before the vehicle speed is decelerated to the predetermined vehicle speed, and when it is determined that the rotation synchronization or the engagement is not completed, the first clutch is disengaged before the engagement by the second clutch is completed.

3. The control method of the electric vehicle according to claim 2, wherein based on a degree of deceleration of the electric vehicle, determination as to whether or not the rotation synchronization or the engagement by the second clutch is completed before the vehicle speed is decelerated to the predetermined vehicle speed is performed.

4. The control method of the electric vehicle according to claim 3, wherein the degree of deceleration of the electric vehicle is determined from a rate of change of the vehicle speed.

5. The control method of the electric vehicle according to claim 3, wherein the degree of deceleration of the electric vehicle is determined from a longitudinal acceleration of the electric vehicle.

6. The control method of the electric vehicle according to claim 3, wherein the degree of deceleration of the electric vehicle is determined from a pedal pressure exerted on a brake pedal.

7. The control method of the electric vehicle according to claim 2, wherein based on an operating state of an anti-lock braking system, determination as to whether or not the rotation synchronization or the engagement by the second clutch is completed before the vehicle speed is decelerated to the predetermined vehicle speed is performed.

8. The control method of the electric vehicle according to claim 2, wherein based on the vehicle speed, determination as to whether or not the rotation synchronization or the engagement by the second clutch is completed before the vehicle speed is decelerated to the predetermined vehicle speed is performed.

9. A drive system of an electric vehicle comprising:
an internal combustion engine;
a generating motor provided and configured to generate electricity by receiving motive force from the internal combustion engine;
a travel motor provided and configured to be driven by electric power generated by the generating motor;
a first clutch interposed on a first motive force transmission path connecting the internal combustion engine and a drive wheel;
a second clutch interposed on a second motive force transmission path connecting the travel motor and the drive wheel, the second motive force transmission path being different from the first motive force transmission path; and
a controller, wherein the controller is configured such that:
in a series hybrid mode in which the electric vehicle travels by motive force transmitted from the travel motor to the drive wheel via the second motive force transmission path, the first clutch is disengaged while the second clutch is engaged,
in an engine direct connected mode in which at least one of the internal combustion engine and the generating motor is used as a drive power source, and the electric vehicle travels by motive force transmitted from the drive power source to the drive wheel via the first motive force transmission path, the second clutch is disengaged while the first clutch is engaged, and
at a mode switching time from the engine direct connected mode to the series hybrid mode, starting a rotation synchronization matching a rotation speed of a travel motor side of the second motive force transmission path and a rotation speed of a drive wheel side of the second motive force transmission path, and engaging the travel motor side of the second motive force transmission path and a wheel side of the second motive force transmission path by the second clutch after completing the rotation synchronization, and wherein
at the mode switching time involving deceleration, when the rotation synchronization or an engagement by the second clutch is not completed before vehicle speed is decelerated to a predetermined vehicle speed, the first clutch is disengaged before the engagement by the second clutch is completed.

* * * * *